United States Patent [19]

King et al.

[11] Patent Number: 5,129,458

[45] Date of Patent: Jul. 14, 1992

[54] TREATING AN UNDERGROUND FORMATION

[75] Inventors: Anthony P. King; Andreas S. W. van Paassen, both of Rijswijk, Netherlands

[73] Assignee: Shell Oil Company, Houston, Tex.

[21] Appl. No.: 827,530

[22] Filed: Jan. 29, 1992

Related U.S. Application Data

[63] Continuation of Ser. No. 710,868, Jun. 6, 1991, abandoned.

[30] Foreign Application Priority Data

Jun. 7, 1990 [GB] United Kingdom ............... 9012727

[51] Int. Cl.$^5$ ............................................. E21B 33/138
[52] U.S. Cl. ................................... 166/295; 405/264; 523/131
[58] Field of Search ................ 166/276, 295; 405/264; 523/131, 131

[56] References Cited

U.S. PATENT DOCUMENTS

| | | | |
|---|---|---|---|
| 3,297,089 | 1/1967 | Spain | 166/295 |
| 3,324,665 | 6/1967 | Robichaux | 405/264 X |
| 3,481,403 | 12/1969 | Gidley et al. | 166/295 |
| 3,857,444 | 12/1977 | Copeland | 166/276 |
| 3,902,557 | 9/1975 | Shaughnessy et al. | 166/295 |
| 3,915,232 | 10/1975 | Grusebeck et al. | 166/295 |
| 3,976,140 | 8/1976 | Shaughessy et al. | 166/295 |
| 4,026,857 | 5/1977 | Brown et al. | |
| 4,179,440 | 12/1979 | Martinez | |

Primary Examiner—George A. Suchfield

[57] ABSTRACT

A method of treating an underground formation is disclosed. The method comprises contacting the underground formation with a resin system comprising between 15 and 30% v of monomeric and/or polymeric organic polyepoxides having more than one epoxy group per molecule, between 5 and 20% v of a curing agent, between 75 and 25% v of a polyalkylene glycol alkyl ether and between 5 and 25% v polyalkylene glycol.

6 Claims, No Drawings

TREATING AN UNDERGROUND FORMATION

This is a continuation of application Ser. No. 710,868, filed Jun. 6, 1991, now abandoned.

FIELD OF THE INVENTION

The present invention relates to a method of treating an underground formation to improve its strength. The method is particularly suitable for treating an underground hydrocarbon fluid-containing formation from which hydrocarbons can be produced. Such an underground hydrocarbon fluid-containing formation is referred to as a reservoir.

BACKGROUND OF THE INVENTION

Production of hydrocarbons is usually done through a well drilled from surface to the reservoir. Such a well is cased to prevent collapse of its wall. To facilitate fluid flowing into the well, the part of the well extending into or through the reservoir is either not cased or, when cased, the casing is perforated locally. If the underground formation includes sandstone, production of hydrocarbons may cause the formation minerals such as sand near the well to be loosened and to be entrained by the fluid flow to surface. The entrained material causes wear of the production equipment through which the fluid passes. To enforce the formation so that the amount of loosened material is reduced, the underground formation is treated with a mixture of a resin system.

This treating of an underground formation comprises contacting the underground formation with a resin system comprising monomeric and/or polymeric organic polyepoxides having more than one epoxy group per molecule and a curing agent in a solvent.

British patent specification No. 940,237 discloses a method of treating an underground formation in which the solvent is selected from the group including aliphatic alcohols, such as methanol, ethanol, butanol or isopropanol. The solvent can further comprise a hydrocarbon component for controlling the reaction rate.

In carrying out the method of treating the underground formation, the resin system is supplied through an injection tubular arranged in a well to the formation zone to be treated. The lower end of the injection tubular is suitably fixed in the lower part of the well with a packer arranged above the zone to be treated. The packer furthermore prevents upward flow of the resin system through the annulus between the wall of the well and the tubular. An example of an injection tubular is a coiled tubing. In an alternative embodiment, two packers can be used, wherein one packer is arranged above the zone to be treated and the other below that zone.

The packer used in the method of treating a formation includes an inflatable annular element which is of an elastomer such as a rubber.

It was found that diffusion of the solvents into the elastomer caused degradation of the elastomer and consequently malfunctioning of the packer.

U.S. Pat. No. 3,857,444 discloses a method of treating a formation in which gravel coated with an uncured epoxy resin system is introduced into the formation. The solvent used in this system is monoethylene glycol n-butyl ether (to be referred to as butyl oxitol) or a mixture of amyl acetate and butyl oxitol. A disadvantage of such a system is that under underground conditions an epoxy system with a glycol ether solvent will not cure in a reasonable time. In addition, acetates are incompatible with rubber.

It is an object of the present invention to provide a method of treating an underground formation wherein the solvents used do not have a detrimental effect on the elastomer of the packer during the time the method of treating the formation is carried out.

It is a further object of the present invention to provide a method wherein the resin system does not easily separate; in other words, solvents should e so selected that both the resin as well as the curing agent are completely soluble in the solvent. It is a further object to provide such a method in which the resin system cures in a reasonable amount of time.

SUMMARY OF THE INVENTION

To this end the method of treating an underground formation according to the present invention comprises contacting the underground formation with a resin system comprising between 15 and 30%v of monomeric and/or polymeric organic polyepoxides having more than one epoxy group per molecule, between 5 and 20%v of a curing agent, between 75 and 25%v of a polyalkylene glycol alkyl ether and between 5 and 25%v polyalkylene glycol.

In the specification the expression "epoxy components" will be used to refer to monomeric and/or polymeric organic polyepoxides having more than one epoxy group per molecule.

In the specification and in the claims the expression "polyalkylene glycol alkyl ether" is used to refer to a substance which has the following structural formula $R'—O—(—R''—O—)_n—H$ wherein $R'$ and $R''$ are alkyl groups. These substances are sometimes referred to as glycol ethers.

DETAILED DESCRIPTION OF THE INVENTION

The polyalkylene glycol alkyl ether preferably is a polyethoxy alkyl ether. The polyalkylene glycol alkyl ether is preferably ethylene glycol hexyl ether $(C_6H_{13}O—(—CH_2CH_2O—)—H$, referred to herein as HEX).

The polyalkylene glycol is preferably polyethylene glycol with an average molecular mass of between 300 and 500 (referred to herein as PEG).

To decrease the reaction rate the resin system preferably comprises diethylene glycol hexyl ether $(C_6H_{11}O—(—CH_2CH_2—O—)_2—H$, referred to herein as HEX2), the volumetric ratio between HEX2 and polyalkylene glycol alkyl ether being between 0.025 and 0.25.

To increase the reaction rate the resin system can optionally also comprise kerosene, the volumetric ratio between kerosene and polyalkylene glycol alkyl ether being between 0.05 and 0.25.

The epoxy system as used in the method according to the invention gels with time. This allows sealing a part of a formation with an impermeable resin layer. When it is required to enforce part of a formation in a permeable manner, excess resin is removed by contacting the formation subsequently with a liquid composition comprising a viscosified hydrocarbon solvent mixture. The latter liquid composition is called an after-flush.

EXAMPLES

To test the effect of solvents on rubber the weight increase of a block of rubber S648R (obtained from Dunlop) was determined after being immersed in a solvent at 25° C. for 1, 6, and 24 hours. The results are shown in Table 1. The size of the rubber block was 60 mm by 10 mm by 2.2 mm.

TABLE 1

| Solvent | Percent of Weight Increase for Rubber Immersed in the Solvent | | |
|---|---|---|---|
| | 1 Hour | 6 Hours | 24 Hours |
| PEG | 0.0 | 0.0 | 0.0 |
| HEX | 1.0 | 1.8 | 3.1 |
| HEX2 | 0.9 | 2.3 | 4.9 |
| Butyl Oxitol | 1.3 | 3.0 | 6.4 |
| Ethyl Acetate | 22.5 | 75.9 | 102.2 |

Acceptable solvent were those solvents that caused a weight increase of less than 5% in 24 hours.

Several of the above solvents were tested to establish the solubility of epoxy component and curing agent. Epoxy components having an epoxy group content between 1 000 and 5 500 mmol/kg (for a pure epoxy component this corresponds to a molecular mass of between 1 000 and 180 kg/kmol) were soluble in polyethylene glycol, diethylene glycol, butyl oxitol and HEX and HEX2. Also the following curing agents were soluble in these solvents: methylene dianiline (to be referred to as MDA), 1,6 hexanediamine, diethyl tetra amine (to be referred to as DETA), EPIKURE 116 TM which is a modified cycloaliphatic amine, and N-2,aminoethylethanolamine. The epoxy components were less soluble in alcohols.

The following experiments were carried out to study the curing of the epoxy system according to the present invention. The epoxy system used in the experiments had the following composition: 22%v EPIKOTE 828 TM (EPIKOTE 828 TM is obtained by reacting diphenylolpropane with epichlorohydrin, has a molecular mass of between 300 and 450 and contains about 1.9 to 2.0 epoxy groups per molecule), 10%v curing agent, MDA, 50%v HEX, 12%v PEG and 6%v kerosene. The viscosity of the epoxy system was measured using a Fann Viscometer with the epoxy system contained in a heated container maintained at a constant temperature. The apparent viscosity, expressed in cP (centipoise), is defined as half the value of the 600 rpm (revolutions per minute) reading, obtained using the Fann Viscometer. In Table 2 the apparent viscosity is listed with time, in minuets, for different temperatures, "c" denotes that no readings could not be obtained because the epoxy system had cured.

TABLE 2

| Temperature | Apparent Viscosity in of Epoxy Systems According to the Invention | | | | | |
|---|---|---|---|---|---|---|
| | 50 min | 100 min | 150 min | 200 min | 250 min | 590 min |
| 50° C. | 9 | 11 | 14 | 18 | 21 | 107 |
| 60° C. | 9 | 12 | 16 | 25 | 39 | c |
| 70° C. | 8 | 14 | 25 | 65 | c | c |
| 80° C. | 7 | 18 | c | c | c | c |

In conclusion, it takes about 6 hours for the epoxy system according to the invention to set at 60° C. and about 150 minutes to set at 80° C.

Adding HEX2 decreases the rate of reaction. For example, at 80° C. adding 10%v HEX2 has the effect that an apparent viscosity of 18 cP is only reached after 180 minutes.

Strength tests and hardness tests were carried out using a pack of Oude Pekela sand having a grain size of between 0.075 and 0.150 mm. The length of the pack was between 16.5 and 18.5 cm, and its diameter 35 mm. The pack was then treated with an epoxy system and cut into samples having a length of 35 mm for testing.

To establish suitable combinations of epoxy and curing agent the hardness of samples was determined after curing the samples at 60° C. for one week. EPIKOTE 828 TM and EPIKOTE 834 TM (EPIKOTE 834 TM is obtained by reacting diphenylolpropane with epichlorohydrin, has a molecular mass of between 470 and 526 and contains about 1.9 to 2.0 epoxy groups per molecule) with the curing agents MDA and 1,6 hexanediamine gave the hardest samples. The composition of the epoxy systems in all these tests was 22%v epoxy component, 10%v curing agent, 50%v HEX, 12%v PEG, and 6%v kerosene.

It was found that when the solvent only contained polyalkylene glycol, such as PEG, or only polyalkylene glycol alkyl ether, such as HEX, only weak samples were obtained, which were still soft and spongy after one week curing at 60° C.

To determine the average compressive strength several samples of Oude Pekela sand were treated with an epoxy system having the following composition: 22%v EPIKOTE 828 TM, 10%v curing agent, MDA, 50%v HEX, 12%v PEG, and 6%v kerosene. About 90% of the values for the compressive stresses were found to be between 20 and 70 bar.

We claim:

1. A method of treating an underground formation comprising contacting the underground formation with a resin system comprising between 15 and 30%v of monomeric or polymeric organic polyepoxides having more than one epoxy group per molecule, between 5 and 20%v of a curing agent, between 75 and 25%v of a polyalkylene glycol alkyl ether, and between 5 and 25%v polyalkylene glycol.

2. The method of claim 1 wherein the alkyl group of the polyalkylene glycol alkyl ether has between 5 and 7 carbon atoms.

3. The method of claim 1 wherein the polyalkylene glycol alkyl ether is a polyethylene glycol alkyl ether.

4. The method of claim 3 wherein the polyalkylene glycol alkyl ether is ethylene glycol hexyl ether.

5. The method of claim 1 wherein the resin system further comprises diethylene glycol hexyl ether, the volumetric ratio between diethylene glycol hexyl ether and polyalkylene glycol alkyl ether being between 0.025 and 0.25.

6. The method of claim 1 wherein the resin system further comprises kerosene, the volumetric ratio between kerosene and polyalkylene glycol alkyl ether being between 0.05 and 0.25.

* * * * *